Patented Oct. 23, 1951

2,572,019

UNITED STATES PATENT OFFICE 2,572,019

CATALYTIC PROCESS FOR ALKYLATING AROMATIC COMPOUNDS USING A METAL MOLYBDITE CATALYST

Frank S. Fawcett and Benjamin W. Howk, Wilmington, Del., assignors to E. I. du Pont de Nemours & Company, Wilmington, Del., a corporation of Delaware No Drawing. Application June 30, 1950, Serial No. 171,566

16 Claims. (Cl. 260—612)

This invention relates to catalytic processes and more particularly to the catalytic alkylation of aromatic compounds.

Alkylation reactions are well known and connote the introduction of alkyl groups into organic compounds under conditions of temperature, pressure, time, etc., referred to as alkylating conditions. Generally speaking, the catalysts which have been found to be most effective in promoting the alkylation of aromatic compounds are materials which are acidic in nature, for example, sulfuric acid, phosphoric acid, hydrogen fluoride, $AlCl_3$, $FeCl_3$, $BF_3$, $BeCl_2$, $TiCl_4$, $ZrCl_4$, $ThCl_4$, $ZnCl_2$, and $TaCl_5$. The presence of acid in the products is a distinct disadvantage because it introduces corrosion problems that can be circumvented only by the employment of expensive corrosion-resistant equipment. Aside from this, problems of isolation and purification of the products are introduced which operate to increase costs.

It is an object of this invention to provide a novel catalytic process for the alkyation of aromatic compounds. A further object is to provide a catalytic process for the alkylation of aromatic compounds employing a catalyst which is non-corrosive. A still further object is to provide a process for the catalytic alkylation of aromatic compounds which overcomes the difficulties associated with the hitherto used alkylation catalysts. Other objects will appear hereinafter.

This invention provides a catalytic process for the alkylation of aromatic compounds which comprises contacting the aromatic compound with an olefin at a temperature within the range of 50° to 500° C. and in the presence of a molybdite of a metal whose ions are soluble in excess aqueous ammonia. The alkylation catalysts used in the practice of this invention are molybdites of metals whose ions are not precipitated as insoluble oxides or hydroxides when solutions of their salts are treated with excess aqueous ammonia.

These molybdites exist in two series, in the first of which the molybdenum is present in the quadrivalent state corresponding to the oxide $MoO_2$, and the hypothetical acid $H_2MoO_3$, while in the second series the molybdenum exists in the bivalent state corresponding to the oxide $MoO$ and the hypothetical acid $H_2MoO_2$. Examples of these molybdites are copper molybdite having the formula $CuMoO_3$, nickel molybdite having the formula $NiMoO_2$ and cobalt molybdite having the formulas $CoMoO_2$ and $CoMoO_3$.

These metal molybdites are more fully described in the copending U. S. application of H. R. Arnold and J. E. Carnahan, Serial No. 111,982, filed August 23, 1949.

In one embodiment of this invention, a pressure reactor is first deoxygenated by sweeping it with oxygen-free nitrogen or by evacuation and then charged with the metal molybdite catalyst under a nitrogen atmosphere. The reactor is then charged with the aromatic compound and olefin in amount such that there is at least one mole of aromatic compound per mole of olefin. The charged reactor is then closed and heated to a temperature in the range from 50° to 500° C. After a heating period of from 1 to 10 hours at the temperature selected for operation, the reactor is permitted to cool, opened, and the contents discharged and filtered to remove the catalyst. If the product is a solid, a solvent is added to dissolve it, and the solution filtered to remove the catalyst. The desired alkylated aromatic compound is separated from the filtrate by fractional distillation or other means known to those skilled in the art.

Thus according to this invention aromatic compounds are alkylated by bringing into contact in a reaction zone an aromatic compound, an olefin, and a molybdite of a metal whose ions are soluble in excess aqueous ammonia, and heating the mixture of aromatic compound and olefin in contact with the metal molybdite alkylation catalyst at a temperature of 50° to 500° C., and separating the alkylated aromatic compound formed by condensation of the olefin on the aromatic nucleus.

The examples which follow are submitted to illustrate and not to limit this invention. Unless otherwise specified, parts are by weight.

Example I

A metal reactor was charged with a mixture of 50 parts of thiophene-free benzene, 50 parts of propylene and 5 parts of nickel molybdite and the mixture was shaken and heated at 200° C. for 5 hours under autogenous pressure. There was recovered 58 parts of liquid product, after filtering to separate the catalyst. On distillation there was obtained 18 parts of a colorless liquid, B. P. 145°–159° C., $n_D^{25}$ 1.4783–1.4871, which was a mixture containing isopropylbenzene and some diisopropylbenzene.

Example II

A mixture of 69 parts of toluene, 32 parts of propylene and 5 parts of nickel molybdite was charged to a shaker tube and, with shaking, was heated at 200° C. for 5 hours under autogenous pressure. After filtering the resulting product to separate the catalyst, 64 parts of yellow liquid was obtained, and when distilled there was obtained 13.1 parts of isopropyltoluene, B. P. 160°–181° C., $n_D^{25}$ 1.4912–1.4940.

Example III

A mixture of 69 parts of toluene, 42 parts of 1-butene, and 5 parts of nickel molybdite was charged to a shaker tube and heated at 200° C. for 5 hours with shaking. After distilling the unreacted toluene, there was obtained a fraction weighing 4.5 parts boiling above 120° C., $n_D^{25}$ 1.4890–1.4899, which was largely sec-butyltoluene.

Example IV

Fifty parts of phenol, 100 parts of propylene and 5 parts of nickel molybdite were charged to a shaker tube and the mixture was shaken and heated for one hour at 100°–160° C. under autogenous pressure. The product was isolated by distillation and by extraction with aqueous-methanolic potassium hydroxide solution to yield 23 parts of a water-white liquid, B. P. 108°–135° C./19 mm., $n_D^{25}$ 1.5112–1.5221, having a phenolic odor. This product was a mixture of alkylated phenols containing monoisopropylphenol and diisopropylphenol.

Example V

A mixture of 50 parts of phenol, 100 parts of isobutylene and 5 parts of nickel molybdite was charged to a shaker tube and heated with shaking at 200° C. for 5 hours. The resulting semi-solid product was dissolved in ether and filtered to separate the catalyst. The ether was removed by distillation under reduced pressure and on adding n-pentane to the resulting semi-solid residue and cooling, a slurry of fine white crystals was obtained which on filtration yielded 31 parts of crude p-tert.-butylphenol, M. P. 93–97° C. When recrystallized from water the M. P. was raised to 98–99° C. The recrystallized material when mixed with an authentic sample of p-tert.-butylphenol showed no depression in melting point. The filtrate obtained on separating the crude p-tert.-butylphenol was distilled to give an additional 16 parts of monotertiary butylphenol and 37 parts of C8 alkylphenols.

When this experiment was repeated using copper molybdite catalyst there was obtained 8 parts of alkylation product consisting largely of p-t.-butylphenol, M. P. 90–96° C. The M. P. of a mixture of this material with an authentic sample of p-t.-butylphenol was 92–99° C. In a similar experiment in which no catalyst was used, i. e. in which just phenol and isobutylene were heated at 200° C. for 5 hours, there was no evidence of alkylation, and 96% of the phenol was recovered unreacted.

Example VI

A shaker tube was charged with 56 parts of 1-octene, 47 parts of phenol, and 5 parts of nickel molybdite and the mixture was shaken and heated at 200° C. for 5 hours under autogenous pressure. The resulting mixture was filtered to separate the catalyst and 83 parts of liquid product was obtained which on distillation yielded 21.3 parts of crude octyl phenol, B. P. 100–158° C./12–15 mm., $n_D^{25}$ 1.4892–1.5013. The octylphenol was purified by extraction with aqueous-methanolic potassium hydroxide and the resulting material, $n_D^{25}$ 1.5028, on distillation had B. P. 148°–152° C./11 mm., $n_D^{25}$ 1.5038–1.5044.

Anal. Calc'd. for $C_{14}H_{22}O$: C, 81.4; H, 10.7. Found: C, 81.87, 81.32, 81.43; H, 10.98, 10.78, 10.97.

Example VII

A mixture of 56 parts of diisobutylene (a dimer obtained from isobutylene consisting of a mixture of 2,4,4-trimethyl-1-pentene and 2,4,4-trimethyl-2-pentene), 47 parts of phenol and 5 parts of nickel molybdite was charged to a shaker tube and heated with shaking at 200° C. for 5 hours under autogenous pressure. The product was rinsed from the tube with methanol, filtered to separate the catalyst and the filtrate was distilled giving 10 parts of crude octylphenol, B. P. 138°–157° C./15–17 mm. This material was solid when cooled to room temperature. After recrystallization from n-pentane there was obtained p-octylphenol (p-(alpha,alpha, gamma,gamma-tetramethylbutyl)phenol), M. P. 85°–86° C. The melting point reported in the literature for this p-octylphenol is 84° C., and the B. P. 163° C./20 mm.

Example VIII

A mixture of 50 parts of resorcinol, 56 parts of 1-octene, and 5 parts of nickel molybdite was placed in a shaker tube and heated at 200° C. under autogenous pressure for 5 hours with shaking. The resulting product was filtered to separate the catalyst and the filtrate was distilled to remove unreacted olefin. The resulting solid mixture was dissolved in water and the solution was extracted with methylene chloride. The methylene chloride extract was dried and the solvent removed by distillation under reduced pressure. There was obtained 10.5 parts of alkylated resorcinol which after distillation in a molecular-type still had $n_D^{25}$ 1.5171–1.5178. It was identified as octyl resorcinol by analysis.

Anal. Calc'd. for $C_{14}H_{22}O$: C, 75.8; H, 10.0. Found: C, 75.39; H, 9.94.

Example IX

Duplicate experiments were carried out as follows: 150 parts of anisole, 50 parts of propylene, and 5 parts of nickel molybdite were charged into a shaker tube and heated with shaking at 150° C. for 5 hours. The products obtained in the two experiments were combined, filtered to separate the catalyst and distilled in a fractionating column. After removal of the unreacted anisole there was obtained 52 parts of p-isopropyl anisole, B. P. 90–96° C./19 mm., $n_D^{25}$ 1.5030.

Anal. Calc'd. for $C_{10}H_{14}O$: C, 80.0; H, 9.41. Found: C, 80.26; H, 9.98.

A higher boiling cut of 5.5 parts, B. P. 112°–119° C./19 mm., $n_D^{25}$ 1.4982 was also obtained which was diisopropylanisole.

In a separate experiment, 100 parts of anisole, 30 parts of propylene and 5 parts of nickel molybdite when heated with shaking at 150° C. for 4 hours under autogenous pressure gave 13 parts of isopropylanisole.

Example X

A mixture of 100 parts of resorcinol dimethyl ether, 35 parts of propylene and 5 parts of nickel molybdite was heated with shaking at 150° C. for 5 hours under autogenous pressure. On distillation there was obtained 23.5 parts of isopropylresorcinol dimethyl ether, B. P. 112°–119° C./11 mm., $n_D^{25}$ 1.5103–1.5131. Anal. Calcd. for $C_{11}H_{16}O$: C, 73.4; H, 8.95. Found: C, 73.51; H, 8.98.

Example XI

A mixture of 1 part of hydroquinone, 5 parts of nickel molybdite, and an excess (100 parts) of isobutylene was heated at 200° C. for 2 hours in a shaker tube. The catalyst was separated by filtration and after removal of volatile material there was obtained 1.9 parts of solid 2,5-ditert.-butyl-1,4-hydroquinone, M. P. 207°–210° C., identified by mixed M. P. with a specimen of 2,5-di-tert.-butyl-1,4-hydroquinone prepared as described in the literature.

Example XII

A mixture of 50 parts of phenol, 54 parts of butadiene and 5 parts of nickel molybdite was heated at 150° C. for 5 hours under autogenous pressure in a shaker tube. The catalyst was separated by filtration using benzene as a solvent and the filtrate was distilled under reduced pressure. There was obtained 63 parts of alkylated phenols, B. P. 70°–112° C./0.2 mm., $n_D^{25}$ 1.5392–1.5370. The product was dissolved in aqueous-methanolic potassium hydroxide and after extraction with petroleum ether the phenolic material was recovered by acidification and re-extraction, B. P. 60°–112° C./0.3 mm., $n_D^{25}$ 1.5388–1.5380. This product absorbed hydrogen in the presence of a platinum catalyst and was thus a mixture of alkylated phenols having side-chain unsaturation. The distillation range and analytical data showed this product to be a mixture of $C_4$- and $C_8$-alkenylphenols.

Calcd. for $C_{10}H_{12}O$: C, 81.1; H, 8.11; g. $H_2/g.$, 0.0135; mol. wt., 148.

Calcd. for $C_{14}H_{18}O$: C, 83.2; H, 8.96; g. $H_2/g.$, 0.0198; mol. wt. 202.

Found: Cut B. P. 60–70° C./0.5 mm.: g. $H_2/g.$, 0.0103, 0.0107. Cut B. P. 100–105° C./0.3 mm.: g. $H_2/g.$, 0.0185, 0.0190.

Composite representing total product: C, 82.08; H, 8.64; mol. wt., 170, 160.

In the foregoing examples certain conditions of temperature, pressure, catalyst concentration, etc., have been used. It is to be understood that these are interdependent variables and that, for comparable results, variation in one may require compensating adjustments in the others.

Although the examples have illustrated operation under autogenous pressure, if desired, the alkylation can be effected under superatmospheric pressures up to the maximum permitted by the mechanical limitations of the equipment employed. In general, the use of pressures in excess of 500 atmospheres does not lead to any compensating advantages from the standpoint of yield of desired product or increased reaction rate. This therefore represents the practical upper limit of pressure. An alternative method of operation consists in simply bubbling the olefin through the heated aromatic compound in the presence of the molybdite catalyst.

The temperature at which the alkylation is effected is an important variable determining the yield of desired alkyl substituted aromatic compound. As a rule, the process is operated at temperatures of from 50° to 500° C. Since the best yields of desired products, at practical rates of reaction, are attained within the range of 90° to 350° C. this embraces the preferred operating temperature conditions.

The metal molybdite catalysts used in the practice of this invention may contain promoters or modifiers such as cadmium, barium, chromium, cobalt, zinc, copper, etc., in varying amounts, if desired. Preferred molybdites, because of their high degree of activity, are the molybdites of nickel, cobalt, and copper. These molybdites may be employed in the form of pellets or as finely divided powders, and they may be used as such or extended on supports such as charcoal, alumina, silica, etc. The particular physical form of the catalyst for maximum activity depends upon the conditions under which the alkylation reaction is to be effected. Thus, for vapor phase or liquid phase continuous operation it is best to have the catalyst in the form of pellets or granules, thus minimizing mechanical losses and making possible reasonable flow rates. If the process is to be operated as a batch operation, it is best that the catalyst be in finely divided form because in this way maximum catalyst activity is attained.

The amount of catalyst employed depends upon such interdependent variables as temperature, pressure, mode of operation, i. e. whether batch, semi-continuous or continuous operation, catalyst activity, effectiveness of contact, materials being reacted, etc. As a rule, in batch operation the amount of catalyst employed will be between 1 and 20% of the weight of the aromatic compound being alkylated. Since good reaction rates are attained, under the preferred operation temperature and pressure conditions, using catalyst in an amount between 3 to 8% of the weight of the aromatic compound, this range embraces the preferred catalyst concentration.

In continuous operation, the weight of aromatic compound being alkylated at any one time is ordinarily less than the weight of the catalyst, but the total weight of aromatic compound alkylated during the active life of the catalyst is usually at least ten times the catalyst weight.

When the activity of the catalyst decreases or disappears through prolonged use, it may be restored by oxidizing the spent molybdite in air or oxygen at temperatures up to 500° C. and then reducing the resulting molybdate to molybdite.

The working examples have illustrated batch operation. However, it is to be understood that the process can be operated either as a semi-continuous or continuous operation. Continuous operation is particularly effective when the feed contains a large excess of the aromatic compound and the conditions of temperature, pressure, and contact time are adjusted to give a high conversion of the olefin to alkylated products. The reactor effluent is subjected to fractional distillation to separate the unreacted aromatic compound and alkylated product, and the unreacted aromatic compound is recycled along with olefin and make-up aromatic compound. In this way maximum utilization of the olefin is insured. The minor amount of unreacted olefin also can be recycled along with the aromatic compound, after suitable purification to remove accumulated diluents such as saturated paraffins and other reaction products.

If desired, the higher alkylates separated in the distillation can be re-cycled by addition to the feed stream. This results in either or both de-alkylation and alkyl transfer reactions, along with the primary alkylation reactions. In this way the higher alkylation products may be re-converted to monoalkylated materials.

The process of this invention is applicable to the alkylation of aromatic compounds in general. It is particularly applicable to the alkylation of aromatic hydrocarbons, phenols and the ethers of such phenols. Especially useful are the mononuclear and dinuclear aromatic hydrocarbons and phenols and the ethers of such phenols because of their availability and ease with which they are alkylated. Examples are benzene, toluene, xylene, naphthalene, phenol, cresols, xylenols, resorcinol, hydroquinone, anisole, phenyl cyclohexyl ether, phenetole, diphenyl ether, phenyl naphthyl ether, halogenated benzenes and the like.

Any olefin or precursor of an olefin, i. e. a compound which yields an olefin under the reaction conditions, can be used as the alkylating agent. Examples are ethylene, propylene, butylenes, diisobutylene, amylenes, octenes, decenes, dodecenes, cyclohexene, cracked gasoline fractions, butadiene, isoprene, terpenes, styrene, alpha-methyl styrene, vinyl cyclohexene, cyclopentadiene, mixed olefins from cracking and/or dehydrogenation of petroleum hydrocarbons, liquid higher olefins obtained by polymerization of lower olefins, olefin-containing petroleum fractions, etc. The preferred olefins because of their reactivity and good yield of desired alkylated product are those having a terminal double bond, particularly the monoolefins and diolefins containing up to 18 carbon atoms.

In general it is desirable to employ a high ratio of aromatic compound to olefin in the reaction zone in order to favor the desired alkylation reaction and to minimize the competitive conversion of the olefin to its polymer. If the process is to be operated to produce primarily polyalkylated compounds, then the ratio of olefin to aromatic compounds in the charge should be raised to correspond to at least the number of alkyl groups which are to be introduced into the compound. In batch or discontinuous operation this is preferably carried out by maintaining the aromatic compound and catalyst at the reaction temperature and, by means of suitable pumps and displacing liquids, adding the large amount of olefin gradually so that as it enters the reaction zone alkylation occurs. This minimizes loss of olefin through polymerization, a side reaction which may take place when the large amount of olefin, aromatic compound, and catalyst are heated together.

An alternative procedure for obtaining the large proportion of olefin required for polyalkylation is to inject the olefin at several points along the path of flow of the reactants through the reaction zone. A still further variant for obtaining polyalkylated products is to fractionate the crude effluent to separate lower and higher alkylation products and to inject the lower alkylation products into the feed stream along with additional olefin and aromatic compound. In this way further alkylation occurs with the formation of substantial yields of polyalkyl derivatives.

This invention provides a catalytic process for the alkylation of aromatic compounds employing an alkylation catalyst which is non-corrosive and which produces the desired alkylated aromatic compounds in high yields.

As many apparently widely different embodiments of this invention may be made without departing from the spirit and scope thereof, it is to be understood that this invention is not limited to the specific embodiments thereof except as defined in the appended claims.

We claim:

1. A process for the catalytic alkylation of an aromatic compound which comprises contacting the aromatic compound with an olefin at a temperature of 50° to 500° C. and in the presence of a molybdite of a metal whose ions are soluble in excess aqueous ammonia.

2. A process as set forth in claim 1 in which said molybdite is nickel molybdite.

3. A process as set forth in claim 1 in which said molybdite is copper molybdite.

4. A process as set forth in claim 1 in which the said olefin contains up to 18 carbon atoms.

5. A process for the catalytic alkylation of an aromatic compound which comprises contacting an aromatic hydrocarbon compound with an olefin at a temperature of 90° to 350° C. and in the presence of a molybdite of a metal whose ions are soluble in excess aqueous ammonia.

6. A process for the catalytic alkylation of an aromatic compound which comprises contacting a phenol with an olefin at a temperature of 90° to 350° C. and in the presence of a molybdite of a metal whose ions are soluble in excess aqueous ammonia.

7. A process for the catalytic alkylation of an aromatic compound which comprises contacting an ether of a phenol with an olefin at a temperature of 90° to 350° C. and in the presence of molybdite of a metal whose ions are soluble in excess aqueous ammonia.

8. A process for the catalytic alkylation of an aromatic compound which comprises contacting the aromatic compound with an olefin having a terminal double bond at a temperature of 50° to 500° C. and in the presence of a molybdite of a metal whose ions are soluble in excess aqueous ammonia.

9. A process for the catalytic alkylation of an aromatic compound which comprises contacting the aromatic compound with a monoolefin having a terminal double bond at a temperature of 50° to 500° C. and in the presence of a molybdite of a metal whose ions are soluble in excess aqueous ammonia.

10. A process for the catalytic alkylation of an aromatic compound which comprises contacting the aromatic compound with a diolefin having a terminal double bond at a temperature of 90° to 350° C. and in the presence of a molybdite of a metal whose ions are soluble in excess aqueous ammonia.

11. A process for the catalytic alkylation of an aromatic compound which comprises contacting benzene with an olefin containing up to 18 carbon atoms at a temperature of 90° to 350° C., and in the presence of a metal molybdite selected from the class consisting of nickel and copper molybdites.

12. A process for the catalytic alkylation of an aromatic compound which comprises contacting toluene with an olefin containing up to 18 carbon atoms at a temperature of 90° to 350° C., and in the presence of a metal molybdite selected from the class consisting of nickel and copper molybdites.

13. A process for the catalytic alkylation of an aromatic compound which comprises contacting phenol with an olefin containing up to 18 carbon atoms at a temperature of 90° to 350° C., and in the presence of a metal molybdite selected from the class consisting of nickel and copper molybdites.

14. A process for the catalytic alkylation of an aromatic compound which comprises contacting phenol with isobutylene at a temperature of 90° to 350° C., and in the presence of a metal molybdite selected from the class consisting of nickel and copper molybdites.

15. A process for the catalytic alkylation of an aromatic compound which comprises contacting phenol with butadiene at a temperature of 90° to 350° C., and in the presence of a metal molybdite selected from the class consisting of nickel and copper molybdites.

16. A process for the catalytic alkylation of an aromatic compound which comprises contacting anisole with an olefin containing up to 18 carbon atoms at a temperature of 90° to 350° C., and in the presence of a metal molybdite selected from the class consisting of nickel and copper molybdites.

FRANK S. FAWCETT.
BENJAMIN W. HOWK.

REFERENCES CITED

The following references are of record in the file of this patent:

UNITED STATES PATENTS

| Number | Name | Date |
|---|---|---|
| 2,077,421 | Lazier | Apr. 20, 1937 |
| 2,510,937 | Tadema | June 6, 1950 |